United States Patent
Walker et al.

(10) Patent No.: US 10,771,468 B1
(45) Date of Patent: Sep. 8, 2020

(54) REQUEST FILTERING AND DATA REDACTION FOR ACCESS CONTROL

(71) Applicant: Amazon Technologies, Inc., Reno, NV (US)

(72) Inventors: David Walker, Old Basing (GB); Bertram Dorn, Furstenfeldbruck (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 101 days.

(21) Appl. No.: 15/384,044

(22) Filed: Dec. 19, 2016

Related U.S. Application Data

(60) Provisional application No. 62/427,725, filed on Nov. 29, 2016.

(51) Int. Cl.
*H04L 29/06* (2006.01)
*G06F 21/62* (2013.01)

(52) U.S. Cl.
CPC ............ *H04L 63/101* (2013.01); *G06F 21/62* (2013.01); *H04L 63/0245* (2013.01); *H04L 63/0281* (2013.01); *H04L 63/08* (2013.01)

(58) Field of Classification Search
CPC ............... H04L 63/101; H04L 63/0245; H04L 63/0281; H04L 63/08; H04L 63/10; H04L 63/102; G06F 21/62
See application file for complete search history.

(56) References Cited

U.S. PATENT DOCUMENTS

| | | | | |
|---|---|---|---|---|
| 8,505,107 | B2 * | 8/2013 | Lee | G06F 21/31 726/29 |
| 8,898,272 | B1 * | 11/2014 | Young | H04L 63/0407 709/223 |
| 2006/0200503 | A1 * | 9/2006 | Dosa | G06F 17/30902 |
| 2014/0101178 | A1 * | 4/2014 | Ginter | G06F 17/30979 707/755 |
| 2017/0063836 | A1 * | 3/2017 | Cui | H04L 63/083 |
| 2017/0091303 | A1 * | 3/2017 | Rashid | G06F 17/30598 |
| 2017/0111444 | A1 * | 4/2017 | Saheba | H04L 67/1012 |

* cited by examiner

*Primary Examiner* — Joseph P Hirl
*Assistant Examiner* — Ka Shan Choy
(74) *Attorney, Agent, or Firm* — Hogan Lovells US LLP

(57) ABSTRACT

Approaches provide for mandatory access controls and account identification masking controls in an electronic environment. For example, a customer can configure a client device to access an API gateway which acts as a proxy for a resource in a resource provider environment. Requests for resources or services can be redirected to the API gateway. A registered function may be triggered when the request is received and may filter the request. After filtering, the request can be forwarded on to the actual API endpoint to access the requested resource. From the client's perspective, the resource is being accessed directly, and from the resource's perspective, it is being accessed by the proxy. This layer of indirection enables data to be protected pre-emptively, rather than waiting for an undesirable condition to exist and then reactively attending to the issue. Additionally, log data may be redacted and/or masked automatically as it is created, protecting sensitive data before it is accessible to administrators or other users.

20 Claims, 8 Drawing Sheets

REQUEST FILTERING AND DATA REDACTION FOR ACCESS CONTROL

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In some environments, a user's account in a resource provider environment may include a root user, having access to, and control over, the entire account. For some security-sensitive users, such a user profile which may be enabled to override most controls on the system can present a security risk. Additionally, rules may be utilized to determine if a particular action has resulted in an unwanted condition and generate an alert. However, such rules are reactive to the unwanted condition existing. This only allows for corrective effort after a potential security or customer compliance breach has occurred.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing access to resources in an electronic environment. In particular, various embodiments provide for mandatory access controls using a multi-account architecture and cross-account permissions. For example, a client device associated with a customer can be configured to access an API gateway. The API gateway may act as a proxy for one or more resources or services made available through a resource environment (i.e., a resource provider environment, service provider environment, or other shared resource or multi-tenant environment). When the customer submits a request or event information to the resource environment, the request can be redirected to the API gateway. A registered function may be triggered when the request is received and may filter the request. For example, attributes of the request may be compared to a blacklist of undesirable outcomes. After filtering, the request can be forwarded on to the actual API endpoint to access the requested resource and/or service. From the client's perspective, the resource or service is being accessed directly, and from the resource or service's perspective, it is being accessed by the proxy. This layer of indirection enables data to be protected preemptively, rather than waiting for an undesirable condition to exist and then reactively attending to the issue. Additionally, log data may be redacted automatically as it is created, protecting sensitive data before it is accessible to administrators or other users.

Various other functions can be implemented within the various embodiments as well as discussed and suggested elsewhere herein.

Figure 1:
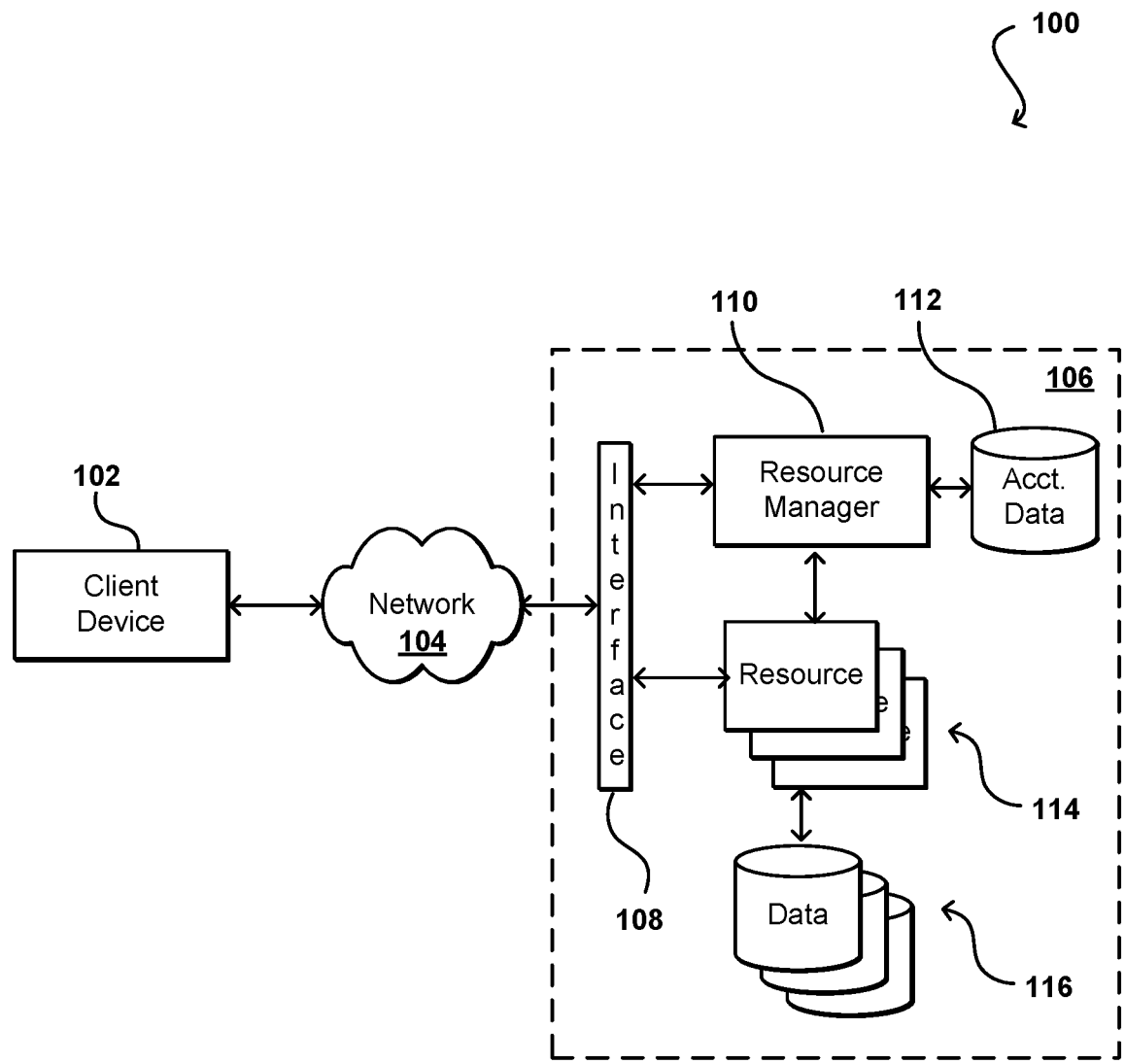
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unpacking requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Figure 2:
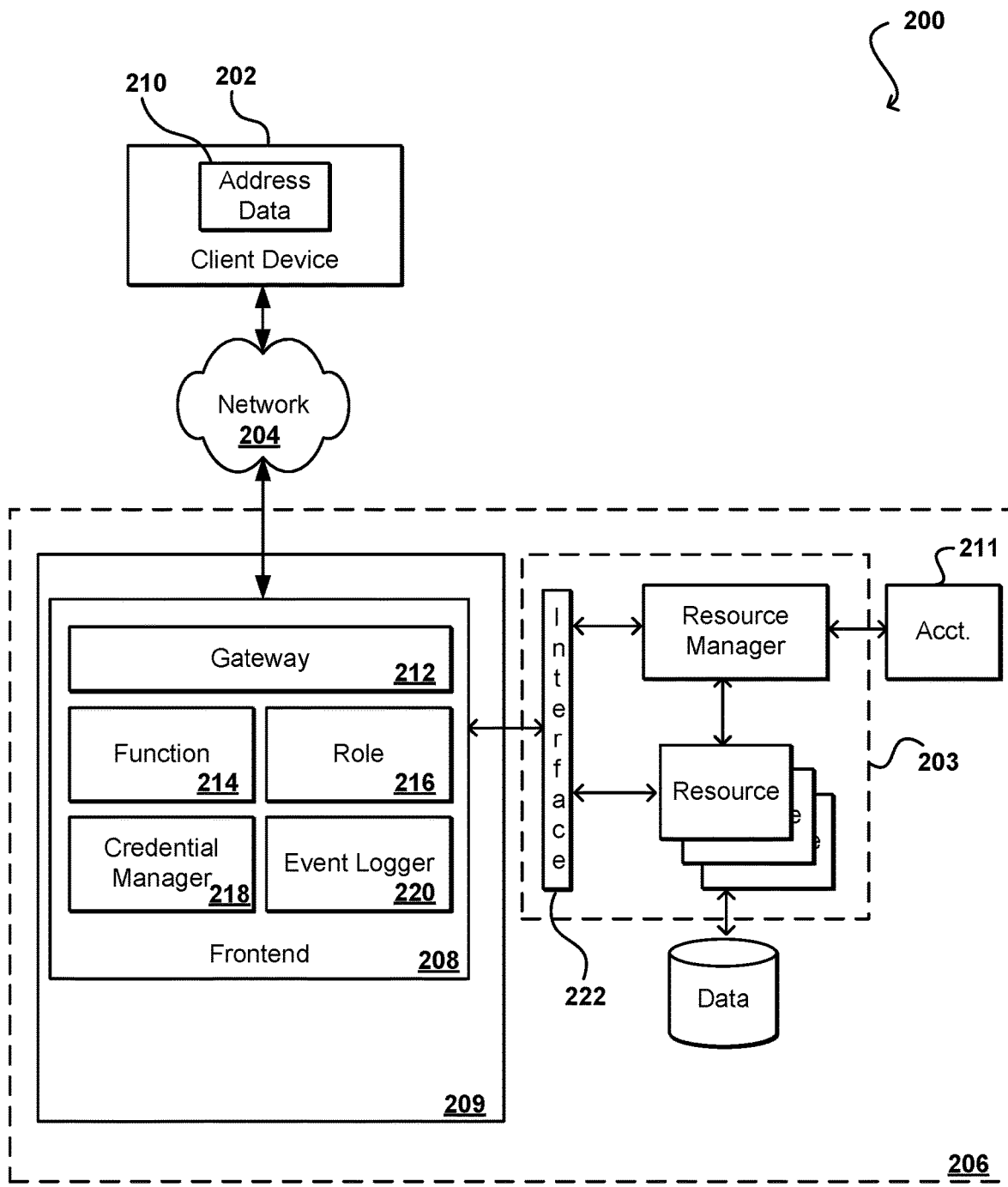
FIG. 2 illustrates an example implementation for request filtering that can be used in accordance with various embodiments.

FIG. 2 illustrates an example frontend implementation for request (e.g., API call) filtering that can be used in accordance with various embodiments. The functionality can be offered as a service, such as a Web service, in at least some embodiments, wherein a client device 202 associated with a customer can submit requests or event information over at least one network 204 to the resource environment 206 (i.e., a resource provider environment, service provider environment, or other shared resource or multi-tenant environment). The events or requests can be associated with specific code to be executed in the resource environment. This code can be registered with the system, and will be referred to herein as a registered function, which can be provided by the resource environment, owned by a respective customer, or available for use by multiple customers, among other such options. The compute service offered by the resource environment can be referred to as a "serverless" compute service that can allocate virtual resources to execute registered functions in response to customer events and automatically manage the underlying compute resources. The registered functions can be executed on high-availability compute infrastructure that can perform the administration of the compute resources, including server and operating system maintenance, capacity provisioning and automatic scaling, code and security patch deployment, and code monitoring and logging. Customers supply the code to be executed and can be billed based on the actual amount of compute time utilized on behalf of those customers.

In some embodiments, a registered function can include the customer code as well as associated configuration information. The configuration information can include, for example, the function name and resource requirements. Registered functions can be considered to be "stateless," with no affinity to the underlying infrastructure, so that the resource managers can rapidly launch as many copies of the function as is needed to scale to the rate of incoming events. A customer providing the code for a registered function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A registered function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for customer requests or events to execute on a virtual compute fleet (e.g., a group of virtual machine instances that may be used to service such requests) based on the frequency of execution of the user code enables high frequency user code to achieve high distribution, which can be good for high availability, and enables low frequency user code to achieve high consolidation, which can be good for cost reduction.

The client device 202 may utilize one or more user interfaces, command-line interfaces (CLIs), application programming interfaces (APIs), and/or other programmatic interfaces to access one or more resources in resource environment 206. A client device may be configured to access a frontend 208, serving as a proxy for at least one resource 203 in the resource environment 206, rather than the API endpoint 222 for the desired resource 203. Although a single API endpoint 222 is shown, this is for illustration purposes only. Various services or resources provided by resource environment 206 may each correspond to one or more API endpoints. For example, API endpoint 222 may be an API endpoint for one resource (represented by box 203) provided by resource environment 206. Address data 210 at client device 208 can be configured to direct requests to gateway 212. The gateway may be configured to receive API calls from the client device as though it were an API endpoint. When a request is received, a registered function 214 may be triggered to be executed on the request. Filtering can be performed by the registered function, which may perform a parse of the API calls unpacked by the API endpoint. In some embodiments, filtering may include string-matching within a large case/switch statement in the registered function. If the API request matches a string in the registered function, an error may be returned and the API request may not be forwarded to the actual API endpoint 222. The registered function may therefore be "default allow" in nature. Alternatively, a "default deny" function may be utilized that only passes on matching requests. In some embodiments, more complex filtering could involve allowing or denying calls based on the request content and other information gained from other capabilities of the registered function—for example API call history by the user gathered from logs, configuration and disposition of other resources, or calls out to other APIs presented by other monitoring and management services. In some embodiments, gateway 212 can verify the client's authentication and authorization using a credential manager 218. Additionally, an event logger 220 may log the request details.

In some embodiments, the frontend, including the API gateway and function can be in a separate account 209 from the user's account 211. The client device may send a request to the API gateway rather than to the actual API endpoint to access the resources. The client device, or user, may have an identity registered in a first account 209 that is hosting the frontend. However, the resources the client device is intending to access/modify may be hosted in a second account 211, accessed through the actual API endpoint 222. This second account may only be accessible by the function (e.g., from an IP address associated with resources executing the function, or other access restriction), rather than the client device or user. As such, the client device does not directly interact with the account that includes the resources. When a response is returned by the API endpoint 222, the function 214 can modify the response such that it appears to be returned by the frontend 208 to the client device 202.

In some embodiments, the code included in a registered function may refer to any program code (e.g., a program, routine, subroutine, thread, etc.) written in a program language. Such code may be executed to achieve a specific task, for example, in connection with a particular web application or mobile application developed by the user. For example, the code may be written in JavaScript (node.js), Java, Python, or any language which can be compiled into functions callable from these languages. The request may include the code (or the location thereof) and one or more arguments to be used for executing the code. For example, the resource provider may provide the code along with the request to execute the code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 206). The virtual compute system may vary its code execution strategy based on where the code is available at the time the request is processed.

The registered function may be associated with a role 216 which may further limit the types of requests that may be allowed to be forwarded to the API endpoint 222. This allows for filtering to be performed by parsing the request and either passing it to the actual service API endpoint or dropping it and raising an appropriate error message. Using an identity management model, the function instances triggered by any event could thus have access to credentials with the same privileges. For example, a registered function can have input access to a specified data bucket specified in the triggering event or write access to a corresponding database table. The assigned identity role for this function could then allow any function instance to read from any available bucket from that data source and write into any available table in the relevant database.

Figure 3:
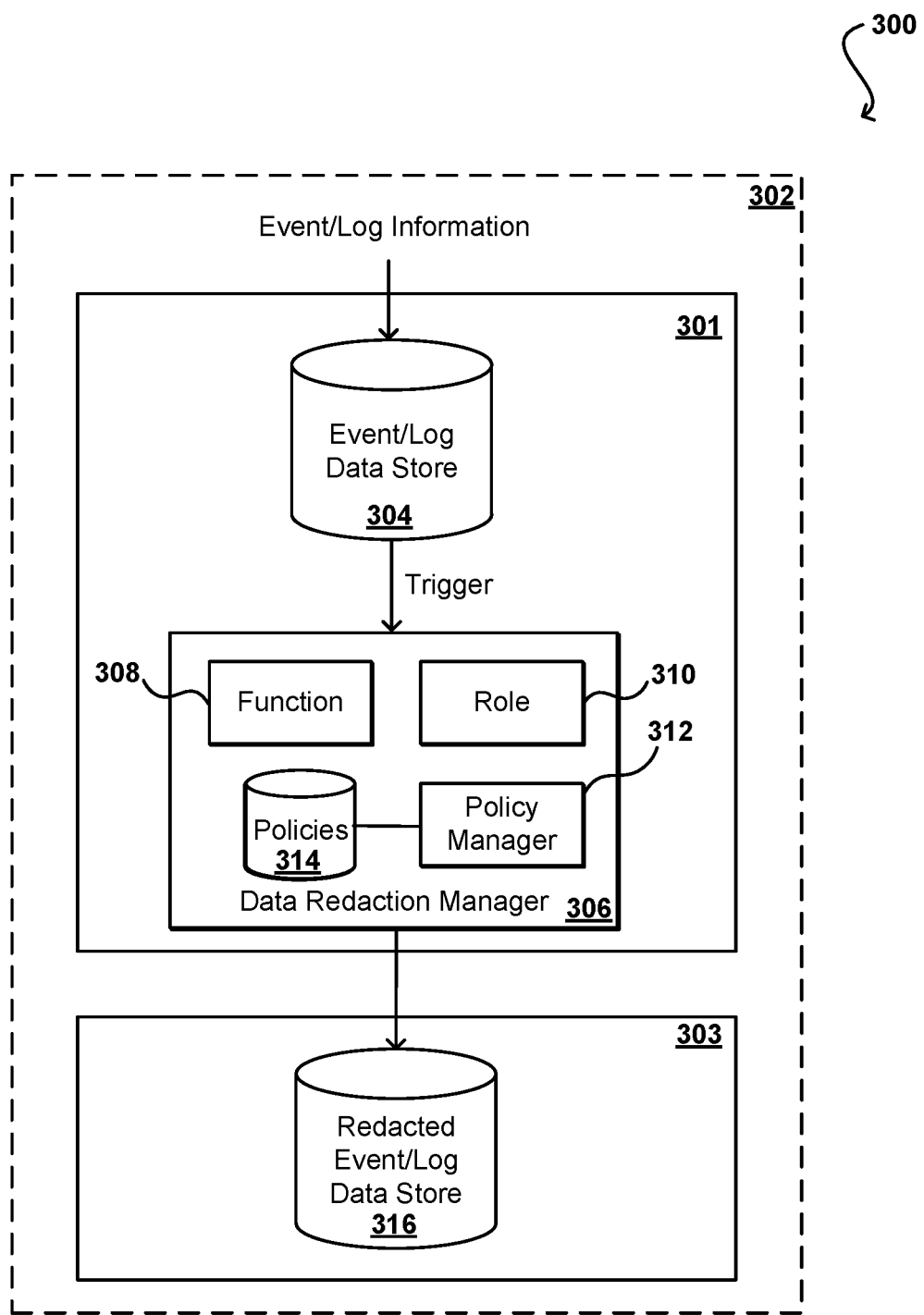
FIG. 3 illustrates an example implementation for data redaction that can be utilized in accordance with various embodiments.

FIG. 3 illustrates an example 300 of data redaction that can be utilized in accordance with various embodiments. As shown in FIG. 3, a resource environment 302 may include an event/log data store 304 which stores event and/or log information generated by, or through the use of, other services. In some embodiments, the event/log data store 304 and the data redaction manager may be hosted in a first account 301 of the resource environment 302. As discussed with respect to FIG. 2, events may be generated when requests are received by the API gateway and the API endpoint. Similarly, other services may generate events as requests are received and processed. These events may be stored in event/log data store 304 or similar data store. This data may include personally identifiable information (PII) or other sensitive data which a user may not want to maintain long term or which must be maintained in a particular format or subject to particular access constraints. Embodiments provide automatic redaction of sensitive data as the data is received, ensuring that it is maintained appropriately at all times.

When data is received at data store 304, such as event or log data, a data redaction manager 306 can automatically execute a registered function 308 on the log data. The registered function may be a serverless function as described above, which may include code that is executed to perform data redaction on the event or log data. Once the data has been redacted (e.g., removing or masking the sensitive data), the registered function can store the redacted data in redacted data store 316. In some embodiments, the redacted data store 316 may be hosted in a second account 303. Both the redacted data store 316 and the event/log data store 304 may be associated with different access controls and/or security, each defined in, and enforced by, their respective accounts 301, 303. For example, redacted data store 316 may be generally available to the customer to perform various analyses on, while event/log data store 304 may only be accessible to particular users under particular circumstances. In some embodiments, each data store 304, 316 may be stored in different accounts further limiting the accessibility of the data in each data store. In some embodiments, the unredacted data in data store 304 may be deleted after a configured time. This allows for the unredacted data to be maintained for forensic or more detailed analyses. The redacted data in data store 316 may be maintained for a longer period of time for further analytics and modeling, which may become more accurate as more data is collected.

In some embodiments, the registered function can be triggered when new data is stored to event/log data store 304. The registered function can read the newly stored data, decompress the data as needed, and load the data into memory. Sensitive data may then be removed or masked, and the resulting redacted data can be compressed and stored in redacted data store 316. In some embodiments, the registered function used may vary depending on the type of data being redacted, the source of the data, the data store to which the unredacted data was stored, etc. In some embodiments, data stored in either of data store 304, 316 may be versioned. Versioning ensures that data is never overwritten; if a file is changed, a new version is created. If the data has only one version, this constitutes proof that that the data has not been changed. In addition to access control in bucket policies, file deletion can be constrained to require authentication with a token or other credential.

As discussed, the user may access an API gateway through a first account while the user's data may be hosted in a second account. In some embodiments, account identifiers associated with the second account may be masked or replaced with account identifiers associated with the first account. This prevents the internal account identifier from being exposed to the user or other entities.

In some embodiments, the registered function may be associated with a role 310, limiting the actions that may be performed by the registered function. For example, the role may limit the function to storing redacted data in the redacted data store 316. By automatically redacting the data, it is not left stored in an improper format, or with the sensitive data unredacted, and can be made available to the user as soon as it is stored. In some embodiments, the particular data to be redacted may be determined based on one or more policies 314. A policy manager 312 may determine an appropriate policy based on, e.g., the user, the type of data being stored, the location where the data is stored, the type of event, etc. In some embodiments, policy manager 312 may manage lifecycles for the redacted and unredacted data.

Figure 4:
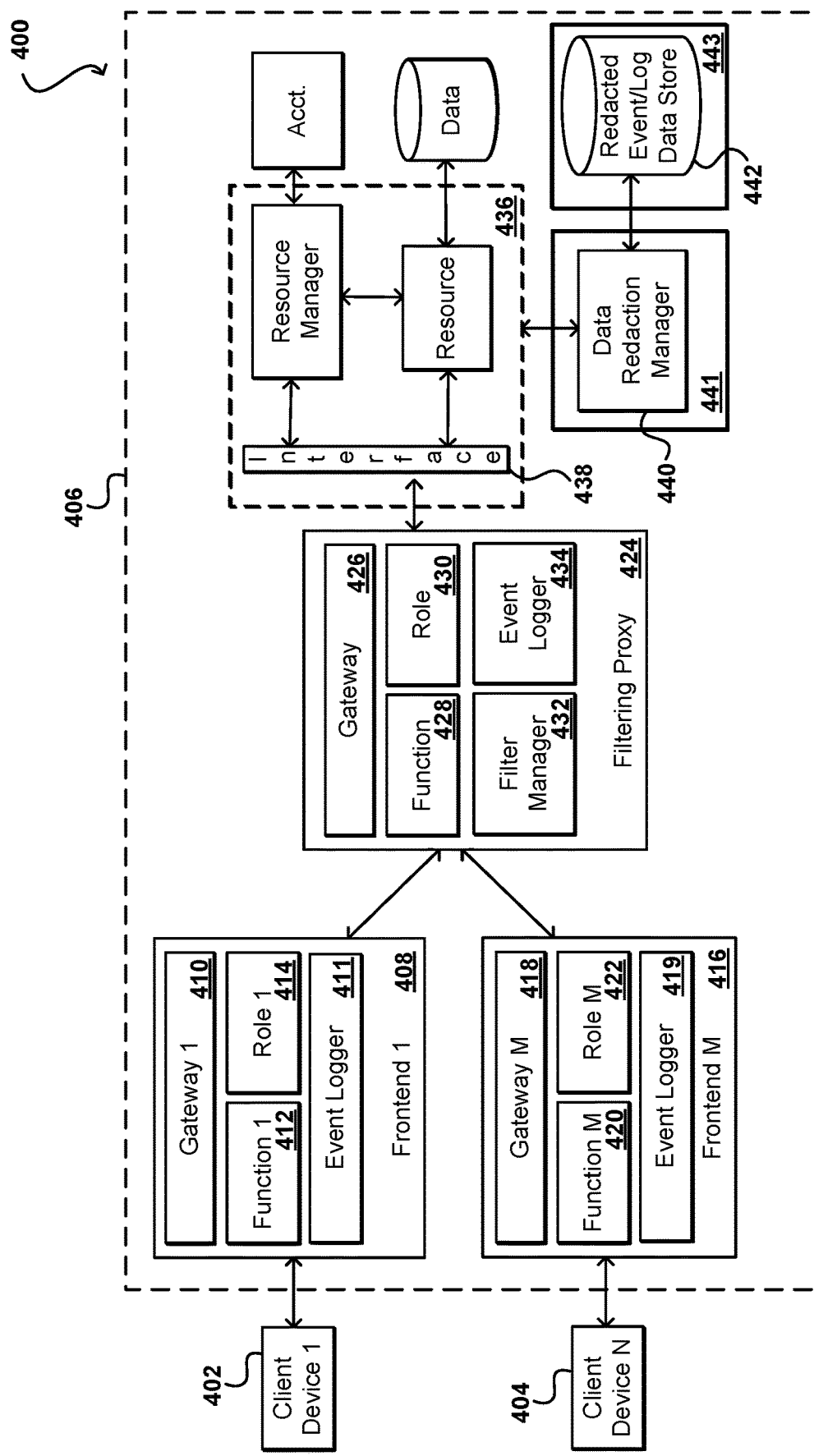
FIG. 4 illustrates an example system for request filtering and data redaction that can be utilized in accordance with various embodiments.

FIG. 4 illustrates an example system 400 for request filtering and data redaction that can be utilized in accordance with various embodiments. The request filtering features of FIG. 2 and the redaction features of FIG. 3 can be combined as shown in FIG. 4. For example, client device 402 can connect to gateway 410 of frontend 408. The client device 402 can connect using, for example, a command line interface, SDK, or other such interface. As discussed above, client device 402 can be configured to communicate with frontend 408 as though it were an endpoint, e.g., endpoint 438 or other such endpoint. In accordance with various embodiments, configuring client device 402 to communicate with frontend 408 can include, e.g., modifying a DNS lookup table, or other mapping mechanism associated with client device 402. The client device 402 can communicate with gateway 410 using standard calls (such as Sigv4) in which are embedded standard API calls (such as RESTful calls). The client device 402 can have one or more users in an account with frontend 408. For simplicity, this account can be referred to as the first frontend account.

Frontend 408 is operable to manage user access, credentials, etc. associated with client device 402. In some embodiments, as discussed above with respect to FIG. 2, gateway 410 can verify a client's authentication and authorization against a frontend access policy and log event details using, e.g., event logger 411 to an event data store. The event data store (not shown) can be associated with an account that is different from the first frontend account. The data store in some embodiments may be associated with at least one of write-only sharing, versioning functionality, a lifecycle policy, among other such security measures.

Function 412 can receive a request, e.g., an API call, from the client device 402 and can filter the request based on one or more attributes of the request. For example, a request which would result in a change considered undesirable, as defined by one or more filter conditions on one or more attributes of the request, can be dropped and an error can be generated and provided to client device 402. Advantageously, such an approach preemptively, rather than reactively, responds to requests for undesirable changes.

Function 412 may be associated with a role 414. A role can be a set of permissions that grant access to actions and resources in a resource provider environment, such as resource provider environment 406. These permissions are associated with the role, not to a user. Such an arrangement provides limitations on which requests client device 402 is able to invoke via the first frontend account of the frontend 408. In some embodiments, the role 414 may be assigned by an account associated with filtering proxy 424. For simplicity, this account can be referred to as an abstraction, filtering, and aggregation account.

Also shown in FIG. 4 is client device 404. As described, different clients, including client 404, may communicate with different frontends, such as frontend 416. The clients may be functionally equivalent, but client device 404 may have been configured to direct requests to gateway 418. Gateway 418 can verify client device's 404 authentication and authorization against a frontend access policy and log event details using event logger 419 to an event data store. As described with respect to frontend 408, frontend 416 can be associated with an account. For simplicity, this account can be referred to as the second frontend account. Function 420 may be associated with role 422. Accordingly, frontend 408, 416, and filtering proxy 424 may be associated with different accounts of the resource environment 406. Function 412 may be associated with role 414 and function 420 may be associated with role 422. Additionally, or alternatively, the data redaction manager and redacted data store may also be associated with different accounts of resource environment 406, here depicted as accounts 441 and 443, respectively. Such architecture enables different client devices to be associated with different endpoints which have different permission sets in a resource account, such as the resource account associated with resources 436.

For example, frontends 408 and 416 can connect to a gateway 426 of filtering proxy 424. Filtering proxy 424 may be in a separate account, e.g., an abstraction, filtering, and aggregation account, from frontends 408, 416. The abstraction, filtering, and aggregation account of the filtering proxy 424 may define and manage roles 414, 422 of each frontend. This way, no user can view or modify the roles or permissions of the frontend accounts or the filtering proxy account. Additionally, the filtering proxy can act as an additional abstraction layer, such that an account identifier and other information related to an account (e.g., a resource account) of the resources 436 can be hidden from users of the resource environment 406. As with frontend 408 and front 416, filtering proxy 424 can log event details using event logger 434 to an event data store.

Filter manager 432 is operable to update filters used by function 412, function 420, and function 428. As described, such functions can receive requests (e.g., API calls) and filter the requests based on one or more attributes or information associated with a request. Filter manager 432 is operable to update, e.g., add, remove, modify one or more filter conditions on one or more attributes that are used to determine whether any request would result in a change considered undesirable.

Gateway 426 operates as gateway 410 and gateway 418. Role 430 associated with function 428 can be defined by the resource account associated with resource 436, providing the permissions to perform expected functions. Endpoint 438 may be configured to only accept requests from filtering proxy 424, making endpoint 438 inaccessible from client devices 402 and 404 directly. For example, the resource account associated with resources 436 may only accept requests from IP addresses in the range expected for function 428. In another example, function 428 may be configured to communicate directly to endpoint 438, unlike client device 402 which is configured to communicate with frontend 408 instead of interface 438, frontend 408 which is configured to communicate with filtering proxy 424 instead of endpoint 438, client device 404 which is configured to communicate with frontend 416 instead of endpoint 438, and frontend 416 which is configured to communicate with filtering proxy 424 instead of endpoint 438. It should be noted that endpoint 438 may represent just one endpoint for one particular service or resource 436. In some embodiments, various endpoints may be reachable from filtering proxy 424. In yet another example, functions associated with role 430 may only be permitted to make requests at endpoint 438 and functions that are not associated with role 430 may not be permitted.

Accordingly, in accordance with various embodiments, multiple frontends (e.g., 408, 416) and filtering proxies (e.g., 424), each associated with an account (e.g., the first frontend account, the second frontend account, and the abstraction, filtering, and aggregation account), can be set up. The requests which can be made via these accounts, to resources (e.g., resources 436) associated a resource account, can be restricted via the roles assigned to them. The permissions assigned to roles, assigned account to functions (e.g., functions 412, 420, 428), are invisible and immutable to the function involved and also to any users in the account where the function and gateway exists. For example, as described, role 414 is associated with function 412, and the permissions assigned to role 414 are governed by the abstraction, filtering, and aggregation account of filtering proxy 424 rather than the first frontend account of frontend 408. In this way, no user in the first frontend account has control or visibility of any other roles or permission sets assigned to other accounts.

As requests and responses propagate through frontend 408, frontend 416, filtering proxy 424, and resources 436, various events can be logged. These events may include sensitive information, such as identities of requesting entities, account identifiers (e.g., account IDs), and additional logged information. Data redaction manager 440 can be configured to automatically redact sensitive information before it is stored in redacted data store 442, as discussed above with respect to FIG. 3. Once the log records have had account IDs and other sensitive information masked-out, the records are written to data store 442, from where they can be retrieved by customer auditors, security staff, SIEM systems, etc.

Figure 5:
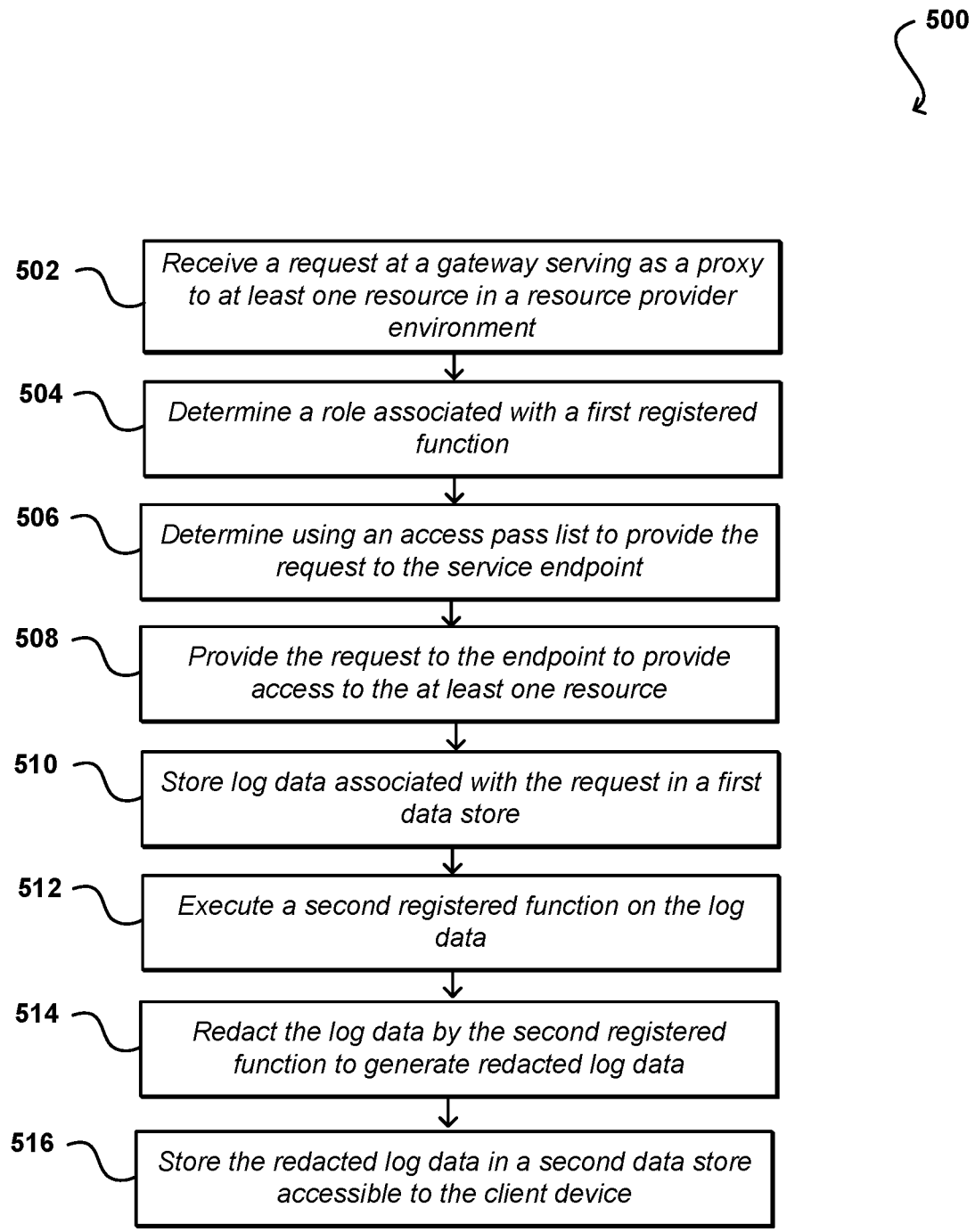
FIG. 5 illustrates an example process for request filtering and data redaction that can be utilized in accordance with various embodiments.

FIG. 5 illustrates an example process 500 for request (e.g., API call) filtering and data redaction that can be utilized in accordance with various embodiments. In this example, a request is received 502 at a gateway serving as a proxy to at least one resource in a resource provider environment. The request can be received from a client device and may intended for an endpoint associated with the at least one resource. For example, the client device may utilize one or more user interfaces, command-line interfaces (CLIs), application programming interfaces (APIs), and/or other programmatic interfaces to access the at least one resource. A role associated with a first registered function can be determined 504. The role is operable to grant access to the at least one resource in the resource provider environment. The gateway and the first registered function can be associated with a first account and the at least one resource can be associated with a second account, accessed through the endpoint. The second account may only be accessible by the registered function, rather than the client device or user. As such, the client device does not directly interact with the second account that hosts the at least one resource. The first registered function can determine 506 using an access control list, to provide the request to the service endpoint. For example, the first registered function may parse the request to determine information associated with the request, attempt to match the parsed information to stored information in the access control list, and determine whether the information meets a matching threshold. In the situation where the information meets the matching threshold, for example, the parsed information matches stored information to an acceptable deviation, the request may be denied and an alert can be generated indicating the request was not successful. In the situation where the information does not meet the matching threshold, the request can be provided 508 to the endpoint to provide access to the at least one resource.

As described, event and/or log data may be generated by, or through the use of, services in response to the request. Log data associated with the request can be stored 510 in a first data store. A second registered function can be triggered by the storing of the log data in the first data store, and can be executed 512 on the log data. The log data can be redacted 514 (e.g., masked or removed) by the second registered function to generate redacted log data. The redacted log data can be stored 516 in a second data store accessible to the client device.

Figure 6:
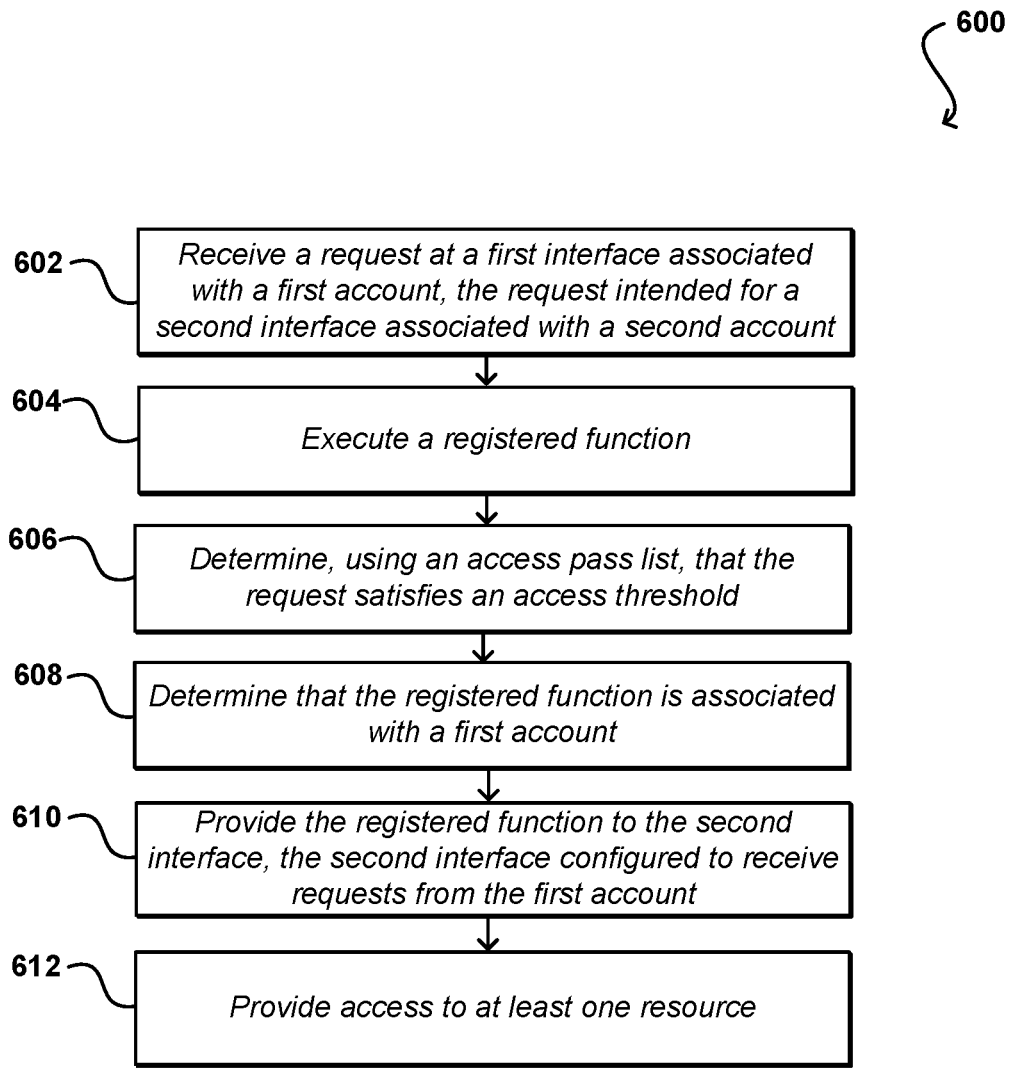
FIG. 6 illustrates an example process for request filtering that can be utilized in accordance with various embodiments.

FIG. 6 illustrates an example process 600 for request filtering that can be utilized in accordance with various embodiments. In this example, a request can be received 602 at a first interface (e.g., a gateway) associated with a first account, the request received from a client device and intended for a second interface (e.g., an endpoint) associated with a second account. For example, as described, a client device may be configured to access a gateway of a frontend device, serving as a proxy for at least one resource in a resource environment, rather than the endpoint for the desired at least one resource. This can include configuring address data at client device to direct requests to the first interface. The first interface may be configured to receive requests from the client device as though it were an endpoint. In response to the request, a registered function can be executed 604. The registered function can determine 606, using an access control list, that the request satisfies an access threshold. This can include, for example, filtering the request. In some embodiments, filtering may include string-matching within a large case/switch statement in the registered function. If the request matches a string in the registered function, and thus does not satisfy the access control list, an error may be returned and the request may not be forwarded to the second interface. In the situation where the request does not match a string in the registered function, and thus satisfies the access control list, it is determined 608 that the registered function is associated with the first account. The request can be provided 610 to the second interface, where the second interface is configured to receive requests from the first account. The second interface can provide 612 access to the at least one resource. Accordingly, in accordance with various embodiments, the client device, or user, may have an identity registered in the first account that is hosting the first interface. However, the resource the client device is intending to access/modify is hosted in the second account, accessed through the second interface. In this example, the second account may only be accessible by the function (e.g., from an IP address associated with resources executing the function, or other access restriction), rather than the client device or user. As such, the client device does not directly interact with the second account. When a response is returned by the second interface, the registered function can modify the response such that it appears to be returned by the first interface to the client device.

Figure 7:
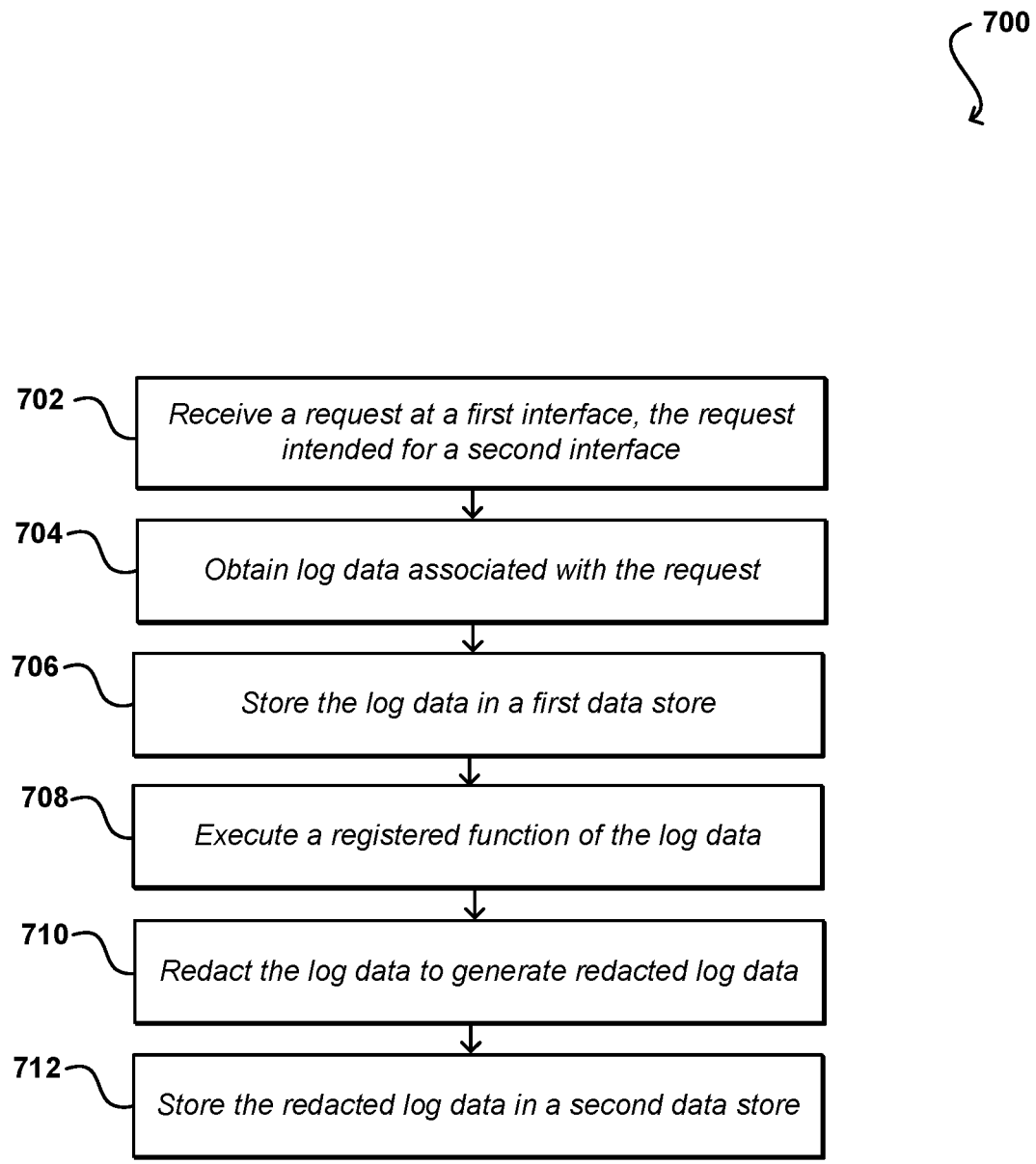
FIG. 7 illustrates an example process for data redaction that can be utilized in accordance with various embodiments.

FIG. 7 illustrates an example process 700 data for redaction that can be utilized in accordance with various embodiments. As described, events may be generated when requests are received by a first interface (e.g., a gateway) and a second interface (e.g., an interface.) Similarly, other services may generate events as requests are received and processed. These events may be stored in an event/log data store or similar data store. This data may include personally identifiable information (PII) or other sensitive data which a user may not want to maintain long term or which must be maintained in a particular format or subject to particular access constraints. Accordingly, embodiments provide automatic redaction of sensitive data as the data is received, ensuring that it is maintained appropriately at all times. For example, a request at the first interface serving as a proxy to at least one resource in a resource provider environment is received 702, the request received from a client device and intended for the second interface. Log data associated with the request can be obtained 704 and stored 706 in a first data store. In various embodiments the first data store can be hosted in a first account. Once the log data is stored in the first data store (e.g., an event/log data store), a registered function can be executed 708 on the log data. The registered function may be a serverless function as described above, which may include code that is executed to perform data redaction on the event or log data. The log data can be redacted 710 (e.g., masked or removed) by the registered function to generate redacted log data. For example, the registered function can read the log data, decompress the log data as needed, and load the log data into memory. Sensitive data of the log data may then be removed or masked, and the resulting redacted log data can be compressed and stored in the second data store. In some embodiments, the registered function used may vary depending on the type of log data being redacted, the source of the log data, the data store to which the first log data was stored, etc. In some embodiments, data stored in either of data stores may be versioned. Versioning ensures that the log data is not overwritten—if a file is changed, a new version is created. If the log data has only one version, this constitutes proof that that the data has not been changed. Once the data has been redacted, the redacted log data can be stored 712 in a second data store (e.g., a redacted data store) accessible to the client device. In some embodiments, the second data store may be hosted in a second account. Both the second data store and the first data store may be associated with different access controls and/or security, each defined in, and enforced by, their respective accounts. For example, the second data store may be generally available to a customer to perform various analyses on, while the first data store may only be accessible to particular users under particular circumstances. In some embodiments, the log data in the first data store may be deleted after a configured time. This allows for the log data to be maintained for forensic or more detailed analyses. The redacted log data in the second data store may be maintained for a longer period of time for further analytics and modeling, which may become more accurate as more data is collected.

Figure 8:
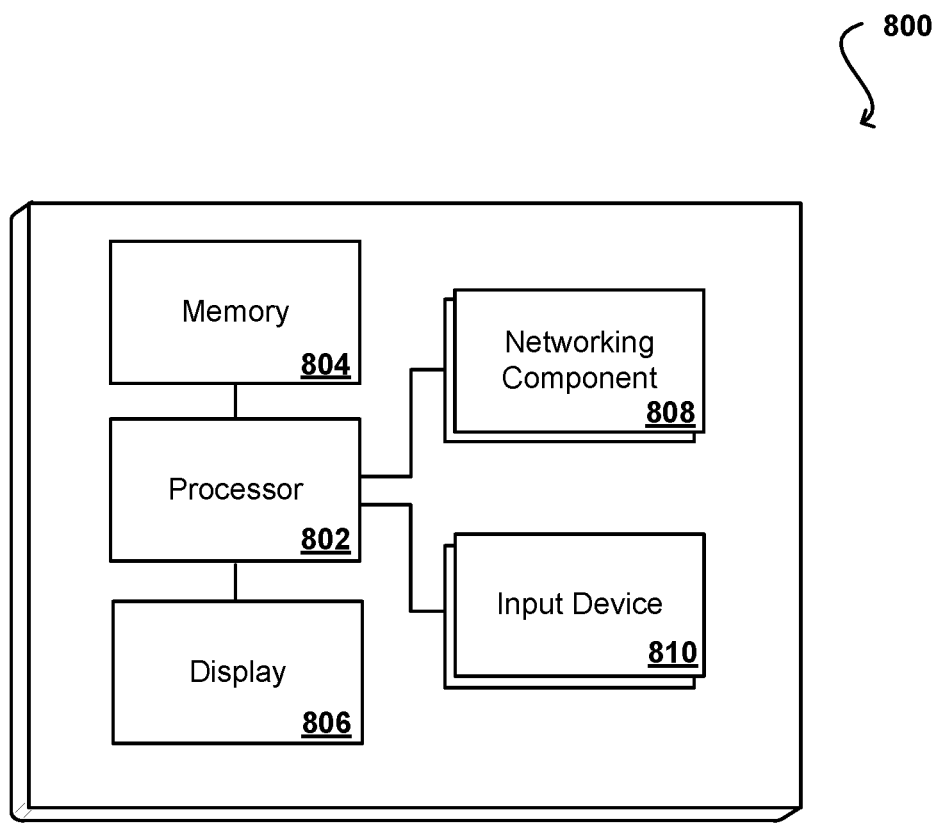
FIG. 8 illustrates example components of a computing device that can be used to implement aspects of the various embodiments.

FIG. 8 illustrates a set of basic components of an example computing device 1000 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    at least one processor; and
    memory storing instructions that, when executed by the at least one processor, cause the system to:
        receive a request at a gateway serving as a proxy to at least one resource in a resource provider environment, the request received from a client device and intended for an endpoint associated with the at least one resource;
        determine a role for a first registered function comprising code for execution in the resource provider environment, the role having a set of permissions for limiting the first registered function and for granting access to the at least one resource in the resource provider environment, the gateway and the first registered function associated with a first account, the at least one resource associated with a second account and accessible via the endpoint by the first registered function;
        determine, by the first registered function using an access control list, to provide the request to the endpoint;
        provide the request to the endpoint to access to the at least one resource;

store log data associated with the request in a first data store;

execute a second registered function on the log data, the second registered function triggered by the storing of the log data in the first data store;

redact the log data by the second registered function to generate redacted log data; and store the redacted log data in a second data store accessible to the client device.

2. The system of claim 1, wherein the instructions when executed further enable the system to:

parse the request to determine attributes associated with the request;

match the attributes to stored attributes in the access control list; and determine whether the attributes match the stored attributes.

3. The system of claim 1, wherein the instructions when executed to provide the request to the endpoint further enable the system to:

identify an address associated with a resource executing the first registered function from the first account; and determine that the address is associated with the first account.

4. The system of claim 1, wherein the instructions when executed further enable the system to:

use the second registered function to identify log data associated with a log data type;

perform one of masking or removing of the log data of the log data type to generate the redacted log data; and compress the redacted log data.

5. A computer-implemented method, comprising:

receiving a request at a first interface, the request received from a client device and intended for a second interface;

determining a registered function comprising code for execution against at least one resource in a provider environment and corresponding to the request, the registered function limited by a set of permissions, the first interface and the registered function associated with a first account, the at least one resource associated with a second account; and providing the request to the second interface to access the at least one resource, the second interface configured to accept requests associated with the first account by the registered function and enable access to the at least one resource.

6. The computer-implemented method of claim 5, further comprising:

verifying at least one of an authentication or authorization of the client device against a policy in the first account.

7. The computer-implemented method of claim 5, further comprising:

configuring address data associated with the client device to direct requests to the first interface, the first interface configured receive requests from the client device as though it were the second interface.

8. The computer-implemented method of claim 5, further comprising:

determining, by the registered function using an access control list, to provide the request to the second interface.

9. The computer-implemented method of claim 8, further comprising:

parsing the request to determine information associated with the request;

matching the information to stored information; and determining whether the information meets a matching threshold.

10. The computer-implemented method of claim 9, further comprising:

determining that the information does not meet the matching threshold; and generating an error notification indicating the request failed.

11. The computer-implemented method of claim 5, further comprising:

generating a response to the request; and modifying the response by the registered function to appear to be returned by the first interface.

12. The computer-implemented method of claim 5, wherein the second account is accessible by resources executing the registered function associated with addresses in a predefined range.

13. The computer-implemented method of claim 5, further comprising:

determining a role associated with the registered function, a scope of actions operable by the registered function limited by the set of permissions granted according to the role.

14. The computer-implemented method of claim 13, further comprising:

modifying at least one of a type of access or a level of access of the set of permissions associated with the role by a resource associated with the second account.

15. The computer-implemented method of claim 13, further comprising:

identifying an address associated with a resource executing the registered function, the address associated with the first account; and providing the request to the second interface based at least in part on the registered function being associated with the first account, the role, the address being associated with the first account.

16. A non-transitory computer readable storage medium storing instructions that, when executed by at least one processor of a computing system, causes the computing system to:

receive a request at a first interface, the request received from a client device and intended for a second interface;

determine a registered function comprising code for execution against at least one resource in a provider environment and corresponding to the request, the registered function limited by a set of permissions, the first interface and the registered function associated with a first account, the at least one resource associated with a second account; and provide the request to the second interface to access the at least one resource, the second interface configured to accept requests associated with the first account by the registered function and enable access to the at least one resource.

17. The non-transitory computer readable storage medium of claim 16, wherein the request is a first request and the registered function is a first registered function, and wherein the instructions when executed further enable the computing system to:

store log data associated with the request in a first data store;

execute a second registered function on the log data, the second registered function triggered by the storing of the log data in the first data store;

redact the log data by the second registered function to generate redacted log data; and store the redacted log data in a second data store accessible to the client device.

18. The non-transitory computer readable storage medium of claim 17, wherein the first data store is associated with a first account, access to the first data store based at least in part on a first set of access controls associated with the first account, the first data store includes at least one of personally identifiable information or account identifiers, and wherein the second data store is associated with a second account, access to the second data store based at least in part on a second set of access controls associated with the second account.

19. The non-transitory computer readable storage medium of claim 17, wherein the second registered function is based at least in part on a log data type being redacted, a source of the log data, or a type of data store associated with the first data store.

20. The non-transitory computer readable storage medium of claim 17, wherein the first data store is associated with a first lifecycle policy and the second data store is associated with a second lifecycle policy, the second lifecycle policy retaining data a greater amount of time than permitted by the first lifecycle policy.

* * * * *